United States Patent
Futamata

(10) Patent No.: US 6,282,705 B1
(45) Date of Patent: Aug. 28, 2001

(54) COMPILER CAPABLE OF REDUCING INTERRUPT HANDLING IN OPTIMIZATION AND ITS OPTIMIZATION METHOD

(75) Inventor: Hideharu Futamata, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/229,033

(22) Filed: Jan. 12, 1999

(30) Foreign Application Priority Data

Jan. 12, 1998 (JP) .................................................. 10-003760

(51) Int. Cl.⁷ ...................................................... G06F 9/45
(52) U.S. Cl. ...................... 717/8; 717/4; 717/9; 710/262; 710/263; 710/264
(58) Field of Search .................. 717/8, 9, 2, 4; 710/262, 263, 264

(56) References Cited

U.S. PATENT DOCUMENTS

| | | | |
|---|---|---|---|
| 5,182,811 | * 1/1993 | Sakamura | 710/264 |
| 5,717,933 | * 2/1998 | Mann | 710/262 |
| 5,812,837 | * 9/1998 | Ozawa | 712/220 |
| 6,061,710 | * 5/2000 | Eickemeyer et al. | 709/107 |
| 6,085,278 | * 7/2000 | Gattes et al. | 710/263 |
| 6,205,508 | * 3/2001 | Bailey et al. | 710/264 |

FOREIGN PATENT DOCUMENTS

| | | |
|---|---|---|
| 2-257224 | 10/1990 | (JP) . |
| 3-218529 | 9/1991 | (JP) . |
| 9-62512 | 3/1997 | (JP) . |
| 9-134292 | 5/1997 | (JP) . |

OTHER PUBLICATIONS

Title: Compilers and optimization: cross– compiler construction and optimization techniques., Elektronica (Jun. 7, 1991) vol. 39, No. 11, p.25–7, 29–31.*

* cited by examiner

Primary Examiner—Kakali Chaki
Assistant Examiner—Chameli C. Das
(74) Attorney, Agent, or Firm—Scully, Scott, Murphy & Presser

(57) ABSTRACT

A compiler comprises a using register control table by function, a using register extracting unit by function for extracting a using register and a call function name, in every function, based on the intermediate code generated from a source program, and registering the same into the using register control table by function, a using register totaling unit by function for totaling the registers used by a call function called by an interruption function, and newly registering the totaled registers in the using register control table by function as the using registers of the interruption function, and an output unit for adding saving/return codes of a using register of the interruption function to the intermediate code, with reference to the using register control table by function so to generate and supply an assembly program file.

13 Claims, 9 Drawing Sheets

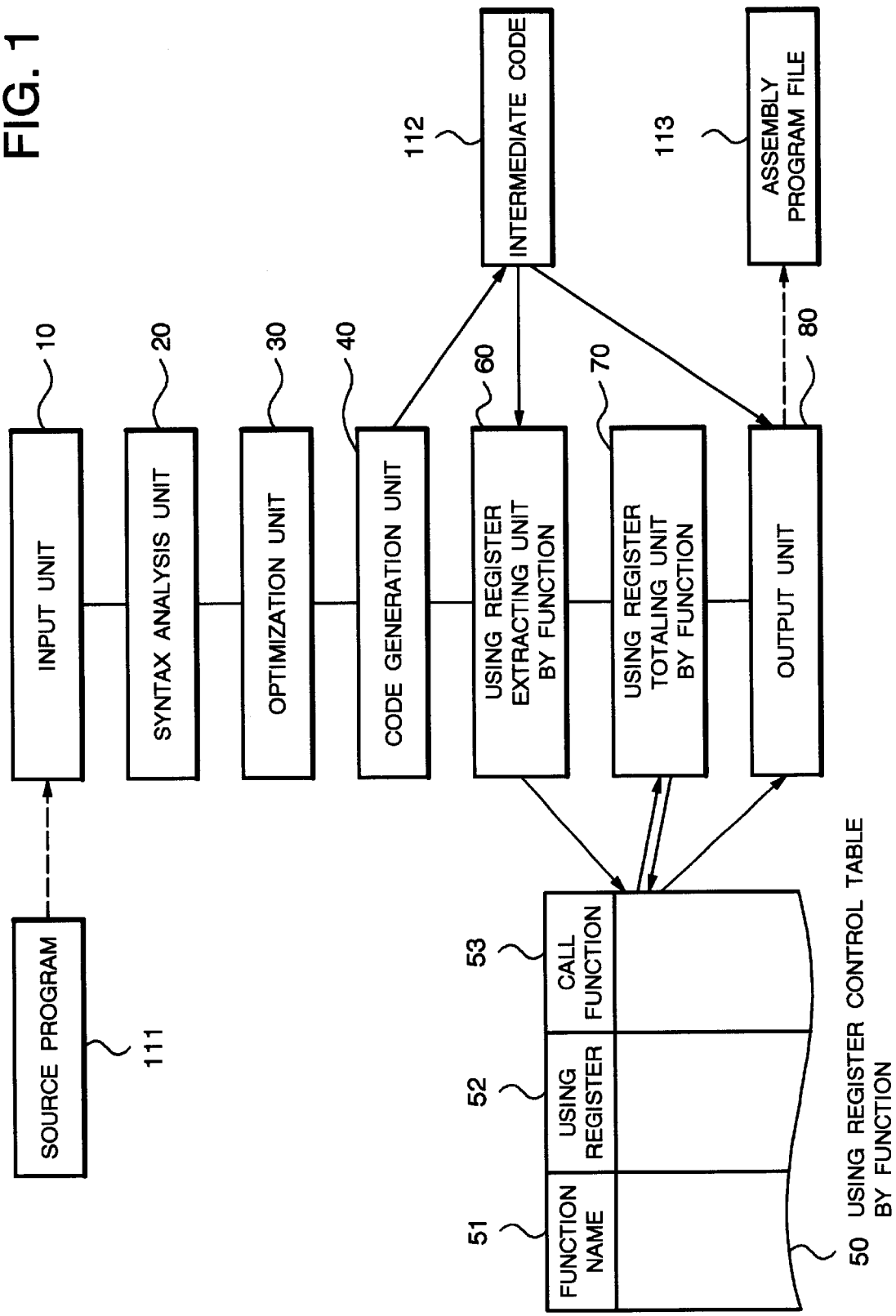

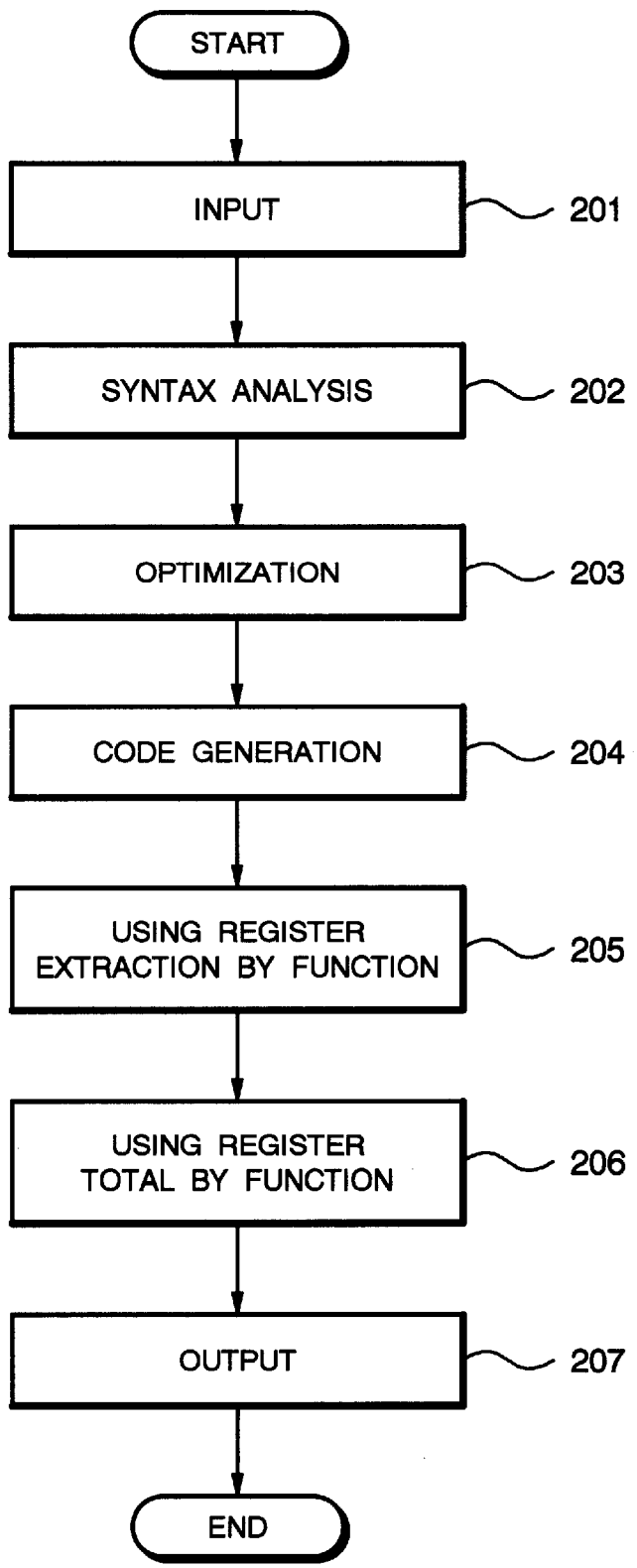

| FUNCTION NAME | USING REGISTER | CALL FUNCTION |
|---|---|---|
| f1 | a, b | f2, f3 |
| f2 | c | f4 |
| f3 | d | f5, f2 |
| f4 | e | f3 |
| f5 | f | |
| f6 | g, h | f5 |

(B)

| FUNCTION NAME | USING REGISTER | CALL FUNCTION |
|---|---|---|
| f1 | a, b, c, e, d, f | |
| f2 | c, e, d, f | |
| f3 | d, f, c | |
| f4 | e, d, f, c | |
| f5 | f | |
| f6 | g, h, f | |

FIG. 6

```
int g, f2(int);
char f3();
void f4(), f5();
__interrupt void f1() {/USE THE REGISTERS a AND b/
g=f2(f3()*g);
}
int f2(int i2) {/USE THE REGISTER c/
f4();
return++i2;
}
char f3() {/USE THE REGISTER d/
f5();
return(char)f2(g);
}
void f4() {/USE THE REGISTER e/
g+=f3();
}
void f5() {/USE THE REGISTER f/
g++;
}
__interrupt void f6() {/USE THE REGISTERS g AND h/
f6();
}
```

COMPILER CAPABLE OF REDUCING INTERRUPT HANDLING IN OPTIMIZATION AND ITS OPTIMIZATION METHOD

BACKGROUNDS OF THE INVENTION

1. Field of the Invention

The present invention relates to a compiler that translates a source program into an object program and an optimization method by the compiler, and more particularly, to a compiler capable of reducing interrupt handling and its optimization method.

2. Description of the Related Art

It is necessary for a compiler which is intended for a device having an interrupt handling function in its architecture to deal with the above interrupt handling function at the compile time. Generally, a routine branching at the occurrence of interruption in a device, that is, an interruption function is designed to be described in a source program, thereby making it possible to deal with the above interrupt handling function.

The interruption function branches irregularly during the execution of a source program. In order to protect the content of a register which has been used before branching, all the contents of the registers that may be used must be saved at the start of the interruption function, and the contents of the saved registers must be returned after finishing the interruption function.

As this kind of the conventional technique, there is an apparatus disclosed in Japanese Patent Publication Laid Open (Kokai) No. Heisei 2-257224, "Linkage Edit Processor". A linkage edit processor disclosed in the same publication deletes a redundant instruction for instructing the saving/return of a register when a register used at a function calling party (calling register) and a register used at a function called party (called register) are not in accord with each other, on the condition that there is no recursive call. Thus, edit processing to reduce the code size and shorten the execution time of a source program is optimized.

This optimization method of edit processing, in the normal function call, requires a code for providing a saving instruction of a calling register before a function call instruction and providing a return instruction of the saved register after the function call instruction, in order not to destroy the content of the calling register at the called party. Provided with a table for registering the call function information and the using register information, this method deletes unnecessary saving/return codes of a register which is not used at the called party, of the saved/returned registers of the function at the calling party, referring to the above table.

FIG. 7 shows a constitutional example of the conventional compiler which deletes the saving/return codes of an unnecessary register in the same way as the optimization method of edit processing disclosed in the Patent Publication No. 2-257224. The compiler shown in FIG. 7 comprises an input unit 701 for receiving a source program to perform a lexical analysis, a syntax analysis unit 702 for generating a syntactic tree after analysis of the syntax from a lexical array, an optimization unit 703 for optimizing the syntax tree, a code generation unit 704 for generating an intermediate code 712 based on the optimized syntax tree, a using register control table by function 705 for registering information on a call function and a using register, a using register extracting unit by function 706 for registering a call function name and a using register in every function into the using register control table by function 705 after analysis of the intermediate code 712, and an output unit 708 for supplying an assembly program file 713 having the saving/return codes of a register which is not used at the called party deleted therefrom.

By reference to FIG. 7, it will be easily understood that the conventional compiler optimization method disclosed in the Patent Publication No. 2-257224 can be realized, in a compiler, by additionally providing the output unit 708 for deleting the saving/return code of a register which is not used at the called party, of the saved/returned registers of the function at the calling party, referring to the using register control table by function 705 and the using register extracting unit by function 706 which supplies the information to the same table, after the code generation unit 704 of a general compiler.

This time, the conventional optimization method of a compiler will be described with reference to FIG. 7 and FIG. 6 showing an example of the source program 711. With reference to the portion corresponding to the intermediate code 712 supplied by the code generation unit 704, in the source program shown in FIG. 6, there is a saving code of the registers "g", "h" used by the function f6, before a call function for the function f5 existing within the function f6, and there is a return code of the registers "g", "h" used by the function f6, after the call function for the function f5.

According to the input intermediate code 712, the using register extracting unit by function 706 recognizes the definition of the function f6 and registers the function name f5 called from the function f6 and the register names "g", "h" used by the function f6 into the using register control table by function 705. Next, it recognizes the definition of the function f5 and registers the register name "f" used by the function f5 into the using register control table by function 705.

The output unit 708 recognizes that no overlapped register name is found between the registers "g", "h" used by the function f6 and the register "f" used by the function f5, with reference to the using register control table by function 705. Then, a saving code of the registers "g", "h" before the call instruction for the function f5 and a return code of the registers "g", "h" after the call instruction for the function f5 are deleted, thereby to supply the assembly program file 713.

The above-mentioned conventional optimization method of a compiler, however, cannot delete the saving/return codes of a register as for a function branching from certain address of a program, like an interruption function.

This is why an interruption function having no function at the calling party will not destroy the content of a register in use at the occurrence time of an interruption of a device; although it is necessary to provide a saving instruction of a register at the head of the interruption function corresponding to a function called party and provide its return instruction at the end of the interruption function, the using register information of a function at the calling party is required in order to delete these saving/return codes; therefore, unnecessarily saved/returned register cannot be detected.

Referring to FIGS. 6 and 7 again, since the function f6 is an interruption function, saving of a register and return of a register are performed respectively at the head and at the end of the function f6 and a register in use at the occurrence time of an irregular interruption is not clear. Therefore, all the registers are saved at the head of the function f6 and all the registers are returned at the end thereof.

The conventional output unit 708 deletes the saving/return codes of a register not in use at the called party, from the saving/return codes of the calling register, in the using register control table by function 705. Therefore, the saving code of all the registers at the head of the function f6 and the return code of all the registers at the end of the function f6 cannot be deleted.

As mentioned above, the conventional compiler and the conventional optimization method thereof is defective in that the saving/return codes of a register cannot be deleted in a function branching at certain address of a program, like an interruption function.

SUMMARY OF THE INVENTION

In order to solve the above conventional defect, an object of the present invention is to provide a compiler and its optimization method improved in processing efficiency by deleting saving/return codes of an unnecessary register at the code output time of an interruption function.

According to the first aspect of the invention, a compiler reading a source program so as to perform a lexical analysis and a syntax analysis, generate an intermediate code, and add saving/return codes of a using register of a function, thereby generating an assembly program file, comprises a using register control table by function for registering the information on a using register of a function and the information on a call function called by the function, in every function within the source program, a using register extracting means by function for extracting a using register and a call function name, in every function, after analysis of the intermediate code, and registering the same into the using register control table by function, a using register totaling means by function for totaling the registers used by a function called by an interruption function, with reference to the using register control table by function with the information registered therein by the using register extracting means by function, and newly registering the totaled registers in the using register control table by function as the using registers of the interruption function, and an output means for adding saving/return codes of a using register of the interruption function to the intermediate code, with reference to the using register control table by function having the using registers totaled by the using register totaling means by function, so to generate and supply an assembly program file.

In the preferred construction, the using register control table by function includes a function name space for registering a function name, a using register space for registering a using register name of the function, and a call function space for registering a call function name called by the function.

In another preferred construction, the using register totaling means by function reads the information having been registered in the using register control table by function sequentially in each function, so as to judge whether there exists a call function called by the function, and when there exists a call function called by the function, the unit deletes the call function from the using register control table by function, reads out the register information of the call function from the using register control table by function, and combines the using register of the call function with the using register of the calling function.

In another preferred construction, the using register totaling means by function reads the information having been registered in the using register control table by function sequentially in each function, so as to judge whether there exists a call function called by the function, when there exists a call function called by the function, the unit deletes the call function from the using register control table by function, reads out the register information of the call function from the using register control table by function, and judges whether there exists a call function further called by this function, when there exists a call function further called by this call function, the unit repeats the operation of deleting the call function and reading the information on this call function recursively, and when there exists no more call function called by the noticed function, the unit combines the using register of the noticed function with the using register of the calling function that is the calling party for the noticed function.

In another preferred construction, the output means, with respect to an interruption function within the intermediate code, supplies the interruption function itself, supplies a saving code of a using register of the interruption function before the interruption function itself, and supplies a return code of the using register of the interruption function after the interruption function itself, while, with respect to the function other than the interruption function, the means supplies the function itself.

According to the second aspect of the invention, an optimization method in a compiler reading a source program so as to perform a lexical analysis and a syntax analysis, generate an intermediate code, and add saving/return codes of a using register in a function, thereby generating an assembly program file, comprising the following steps of extracting a using register and a call function name, in every function, after analysis of the intermediate code, and registering the same into the using register control table by function, totaling the registers used by a function called by an interruption function, with reference to the using register control table by function with the so information registered therein by the using register registering step, and newly registering the totaled registers in the using register control table by function as the using registers of the interruption function, and adding saving/return codes of a using register of the interruption function to the intermediate code, with reference to the using register control table by function having the using registers totaled by the using register totaling step, so to generate and supply an assembly program file.

In the preferred construction, the every function using register totaling step further includes a step of reading the information having been registered in the using register control table by function sequentially in each function, so as to judge whether there exists a call function called by the function, and a step of, when there exists a call function called by the function, deleting the call function from the using register control table by function, reading out the register information of the call function from the using register control table by function, and combining the using register of the call function with the using register of the calling function.

In another preferred construction, the every function using register totaling step further includes a step of reading the information having been registered in the using register control table by function sequentially in each function, so as to judge whether there exists a call function called by the function, a step of, when there exists a call function called by the function, deleting the call function from the using register control table by function, reading out the register information of the call function from the using register control table by function, and judging whether there exists a call function further called by this function, a step of, when there exists a call function further called by the above-mentioned call function, repeating the operation of deleting the call function and reading the information on this call function recursively, and a step of, when there exists no more call function called from the noticed function, combining the using register of the noticed function with the using register of the calling function that is the calling party for the noticed function.

In another preferred construction, the output step includes a step of judging whether a function within the intermediate code is an interruption function or not, and with respect to an interruption function, the step includes a step of supplying a saving code of a using register of the interruption function before the interruption function itself, a step of supplying the interruption function itself, and a step of supplying a return code of a using register of the interruption function after the interruption function itself.

According to another aspect of the invention, a computer readable memory storing a control program for generating an assembly program file by reading a source program, performing a lexical analysis and a syntax analysis, generating an intermediate code, and adding saving/return codes of a using register in a function, in a computer system, the control program comprising the following steps of extracting a using register and a call function name, in every function, after analysis of the intermediate code, and registering the same into the using register control table by function, totaling the registers used by a function called by an interruption function, with reference to the using register control table by function with the information registered therein by the using register registering step, and newly registering the totaled registers in the using register control table by function as the using registers of the interruption function, and adding saving/return codes of a using register of the interruption function, to the intermediate code, with reference to the using register control table by function having the using registers totaled by the using register totaling step, so to generate and supply an assembly program file.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 1 is a block diagram showing the structure of a compiler according to an embodiment of the present invention;

FIG. 2 is a flow chart showing the operation according to the embodiment;

FIG. 5 is a view showing an example of the content of a ing register control table by function;

FIG. 6 is a view showing an example of a source program;

DESCRIPTION OF THE PREFERRED EMBODIMENT

Figure 3A:
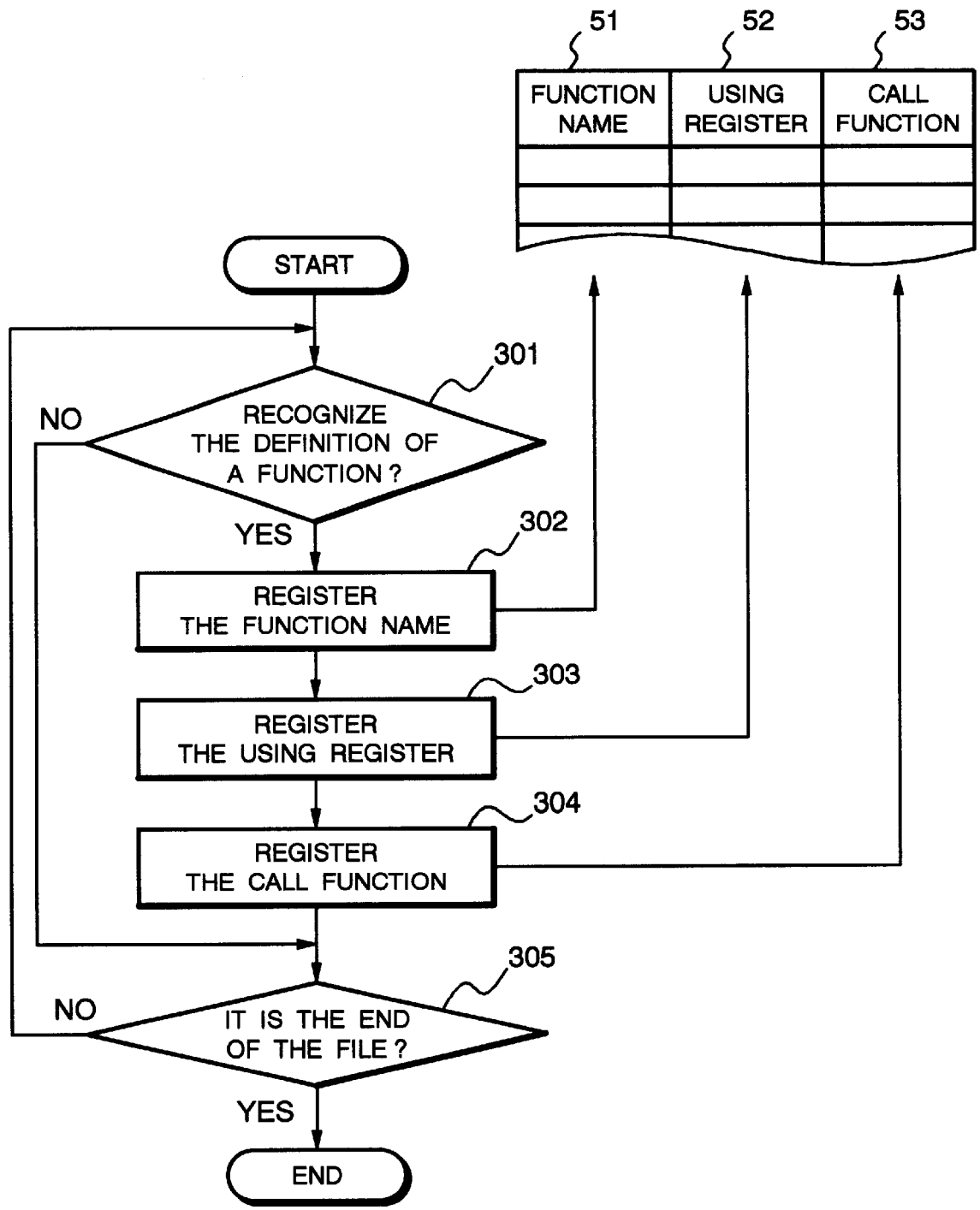
FIG. 3A is a flow chart showing the detailed operation of optimization according to the embodiment, as well as the operation of a using register extracting unit by function.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

FIG. 1 is a block diagram showing the structure of a compiler according to an embodiment of the present invention. With reference to FIG. 1, a compiler of the form of this embodiment comprises an input unit 10, a syntax analysis unit 20, an optimization unit 30, a code generation unit 40, a using register control table by function 50 for registering the information on a call function and a using register, a using register totaling unit by function 70 and a using register extracting unit by function 60 for registering a call function name and its using register in every function into the using register control table by function 50 after analysis of the intermediate code 112, and an output unit 80 for supplying an assembly program file 113. The using register control table by function 50 includes a function name space 51 for registering a function name, a using register space 52 for registering a using register name, and a call function space 53 for registering a call function name. FIG. 1 shows only the characteristic components of the embodiment, and the description of the other general components is omitted.

Figure 7:
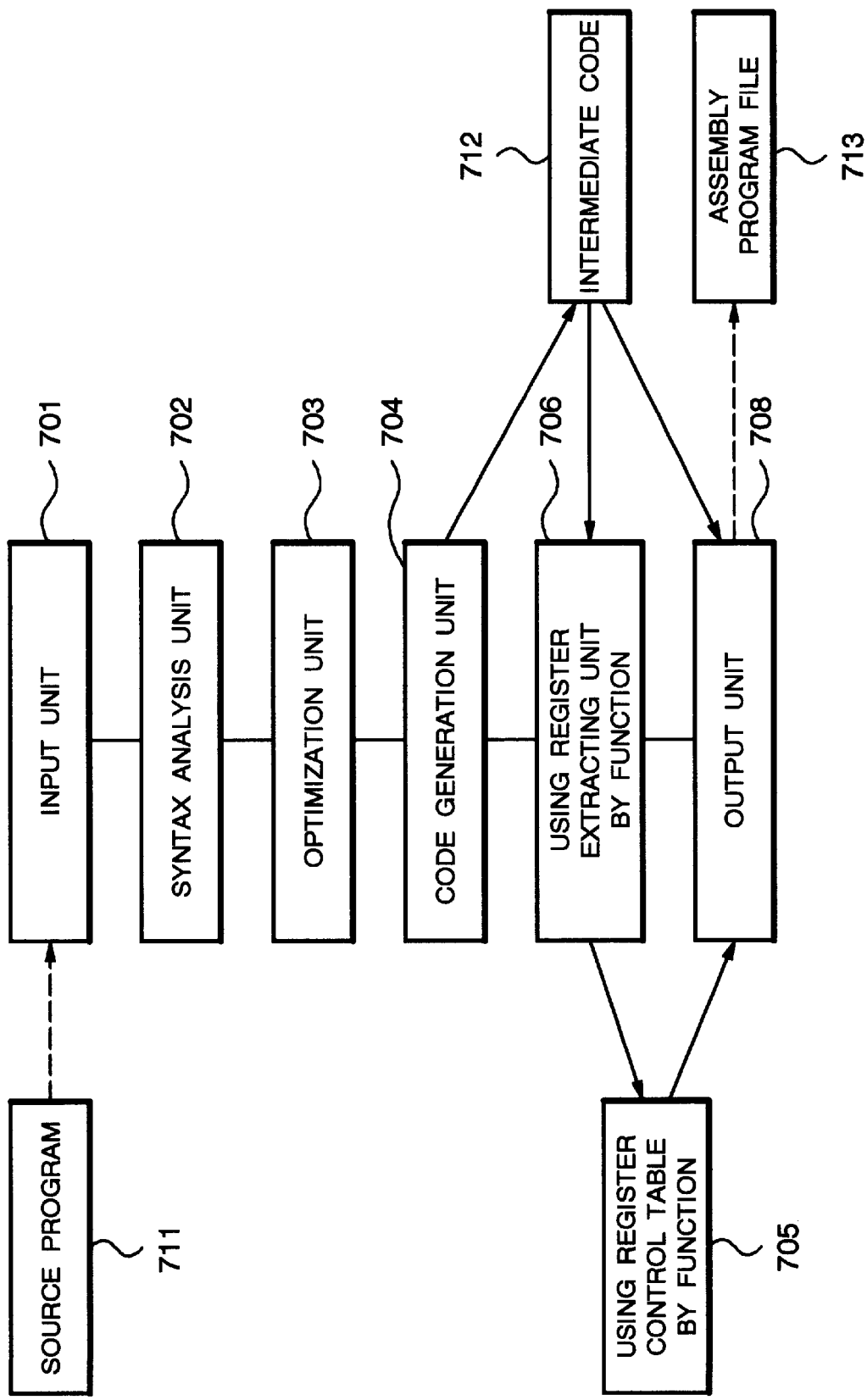
FIG. 7 is a block diagram showing the structure of the conventional compiler.

Of the above components, the input unit 10, the syntax analysis unit 20, the optimization unit 30, the code generation unit 40, the using register control table by function 50, and the using register extracting unit by function 60 are respectively the same as the input unit 701, the syntax analysis unit 702, the optimization unit 703, the code generation unit 704, the using register control table by function 705, and the using register extracting unit by function 706 in the conventional compiler shown in FIG. 7. More specifically, the input unit 10 receives a source program 111, so to analyze lexes, generate a lexical array, and supply it to the syntax analysis unit 20. The syntax analysis unit analyzes a syntax from the lexical array generated by the input unit 10, generates a syntactic tree, and supplies it to the optimization unit 30. The optimization unit 30 optimizes the syntactic tree generated by the syntax analysis unit 20 and supplies it to the code generation unit 40. The code generation unit 40 generates the intermediate code 112 based on the syntactic tree optimized by the optimization unit 30. The using register extracting unit by function 60 analyzes the intermediate code 112 and registers a function name, its using register name, and a call function name into the using register control table by function 50.

The using register totaling unit by function 70 totals registers for use in a function called by an interruption function with reference to the using register control table by function 50. They are registered again into the using register control table by function 50 as the using registers of the interruption function. More specifically, the register names in the corresponding using register space 52 of the using register control table by function 50 of all the functions called by the interruption function and the register names in the corresponding using register space 52 of the using register control table by function 50 of all the functions called by these functions are combined together and registered in the using register space 52 of the using register control table by function 50 of the interruption function.

The output unit 80 deletes the saving/return codes of a register which is not used in the called party and supplies the assembly program file 113 including the saving/return codes of a using register of the interruption function, with reference to the intermediate code 112 and the using register control table by function 50.

FIG. 2 is a flow chart showing the operation by the compiler of the embodiment shown in FIG. 1. With reference to FIG. 2, in the compiler of the embodiment, the input unit 10 receives the source program 111 and generates the syntax array (Step 201). Next, the syntax analysis unit 20 performs a syntax analysis by use of the generated lexical array (Step 202). The optimization unit 30 optimizes a syntactic tree (Step 203). The code generation unit 40 generates the intermediate code 112 based on the optimized syntactic tree (Step 204). Thereafter, the using register extracting unit by function 60 and the using register totaling unit by function 70 analyze the intermediate code 112 and register the function name, its using register name, and the call function name into the using register control table by function 50 (Steps 205 and 206). The output unit 80 generates an assembly program file and supplies the same (Step 207).

The operation in Steps 205 to 207 by the using register extracting unit by function 60, the using register totaling unit by function 70, and the output unit 80 will be described in detail with reference to the flow charts of FIGS. 3A to 3C, and FIG. 4.

With reference to FIG. 3A, when the using register extracting unit by function 60 reads the intermediate code 112 and recognizes the definition of a function within the source program 111, it registers the function name f1 into the function name space 51 of the using register control table by function 50 (Steps 301 and 302). Next, it registers the register name of the same function into the using register space 52 of the using register control table by function 50 (Step 303). Then, it registers the function name of the called function into the call function space 53 of the using register control table by function 50 (Step 304). It is judged whether the function now in operation is the last one of the file and when it is not the last function, the definition of the next function is detected, while when it is the last one, the processing will be finished (Step 305).

Figure 3B:
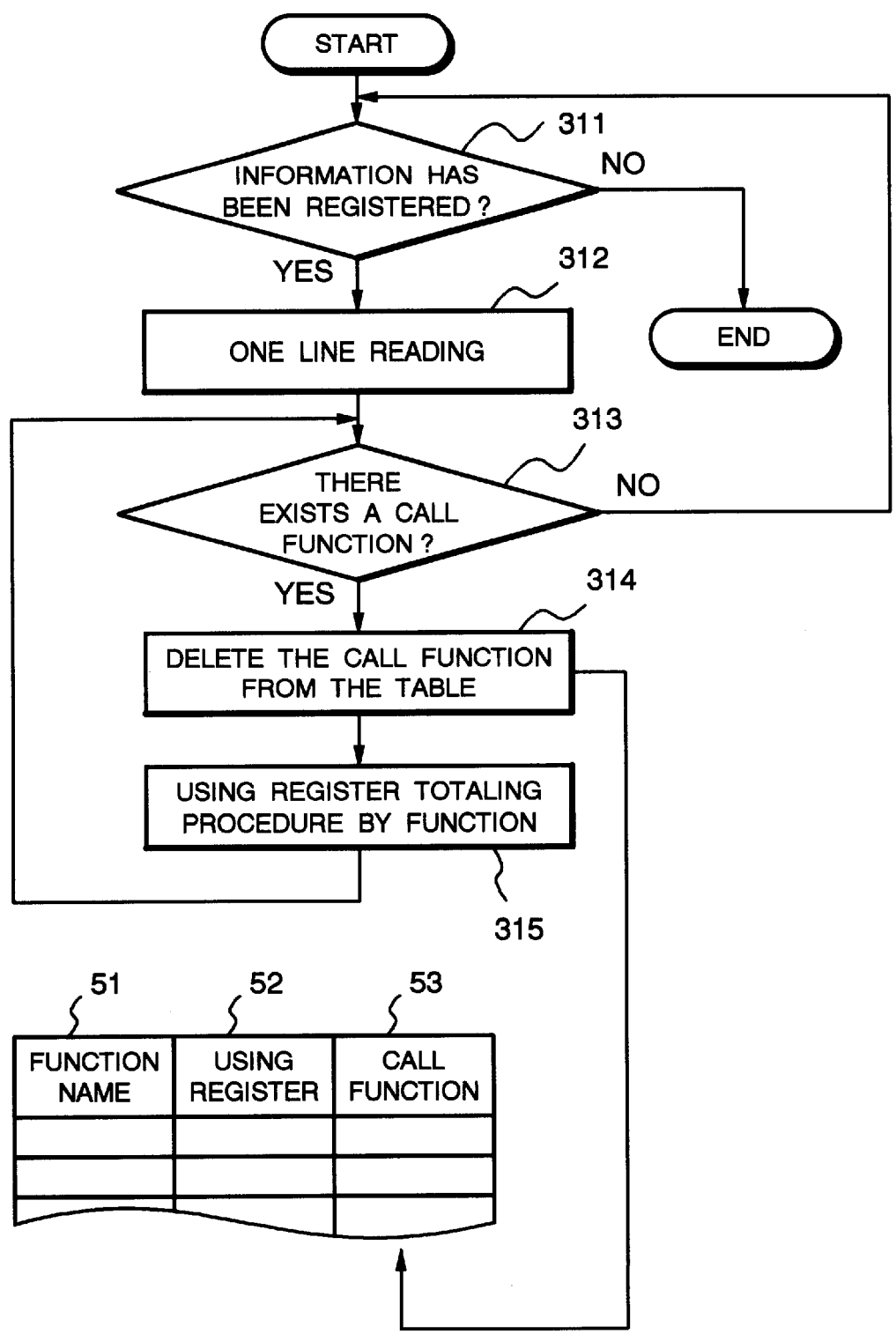
FIG. 3B is a flow chart showing the detailed operation of optimization according to the embodiment, as well as the operation of a using register totaling unit by function.

With reference to FIG. 3B, the using register totaling unit by function 70, at first, judges whether the information has been registered in the using register control table by function 50. If the information has been registered therein, each function name in the function name space 51 is sequentially read from the first line (Steps 311 and 312), and it is judged whether each function name has been registered in the call function space 53. When the unit 70 recognizes that a function name has been registered, this function name is deleted from the call function space 53 (Steps 313 and 314), and the using register totaling procedure by function is called (Step 315).

Figure 3C:
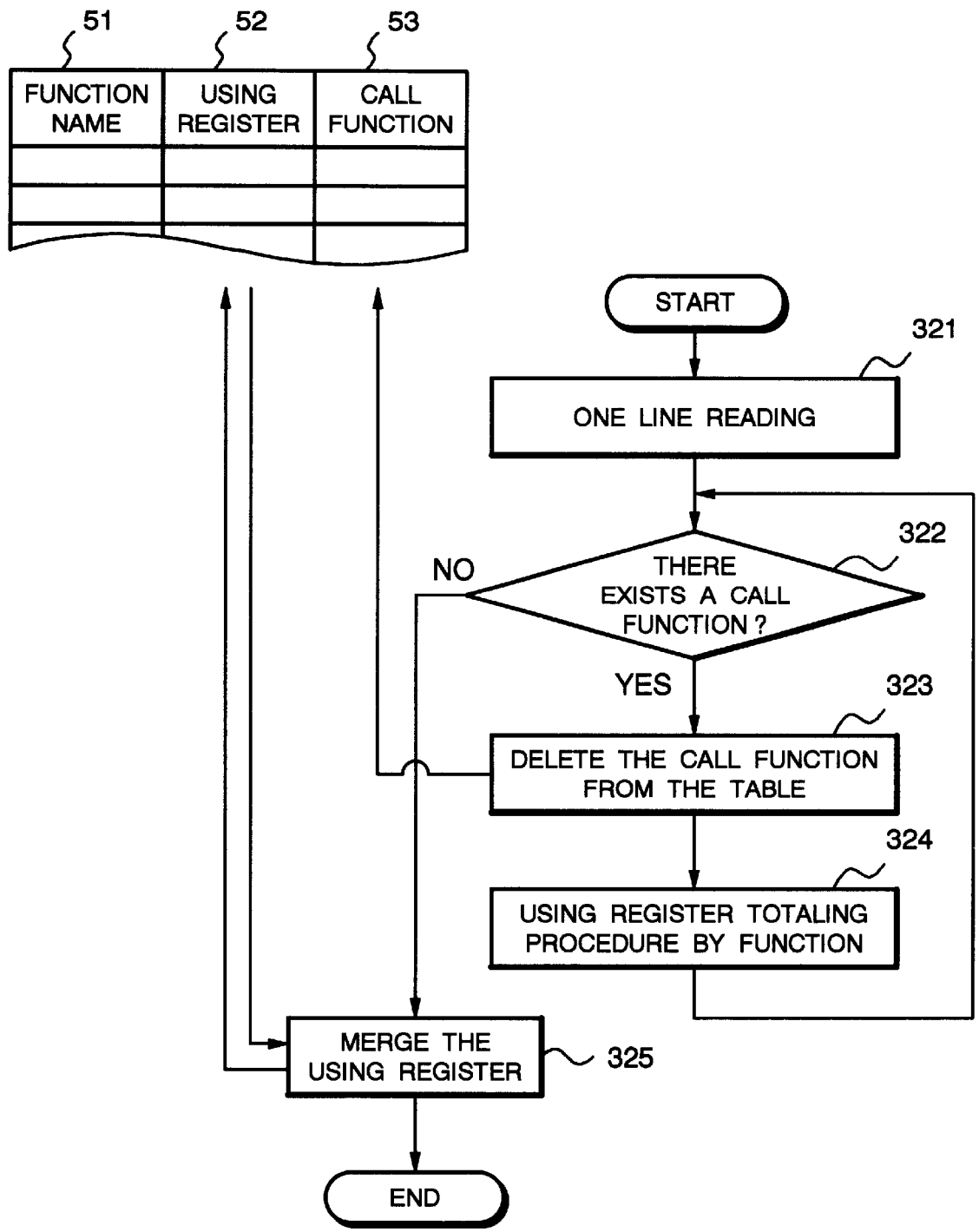
FIG. 3C is a flow chart showing the detailed operation of optimization according to the embodiment, as well as the operation of using register totaling processing by function by the using register totaling unit by function.

With reference to FIG. 3C, the using register totaling unit by function 70 sequentially reads each function name of the function name space 51 from the first line, in the using register totaling procedure by function (Step 321), and it is judged whether each function name has been registered in the call function space 53. When it recognizes that a function name has been registered in the call function space 53, this function name is deleted from the call function space 53 (Steps 322 and 323), and the using register totaling procedure by function will be further continued (Step 324). On the other hand, when it does not recognize that a function name has been registered in the call function space 53, the using register of the function at its called party is called, which will be registered together with the register of the calling function in the using register space 52 of the calling function, and the using register totaling procedure by function will be finished (Step 325).

Figure 4:
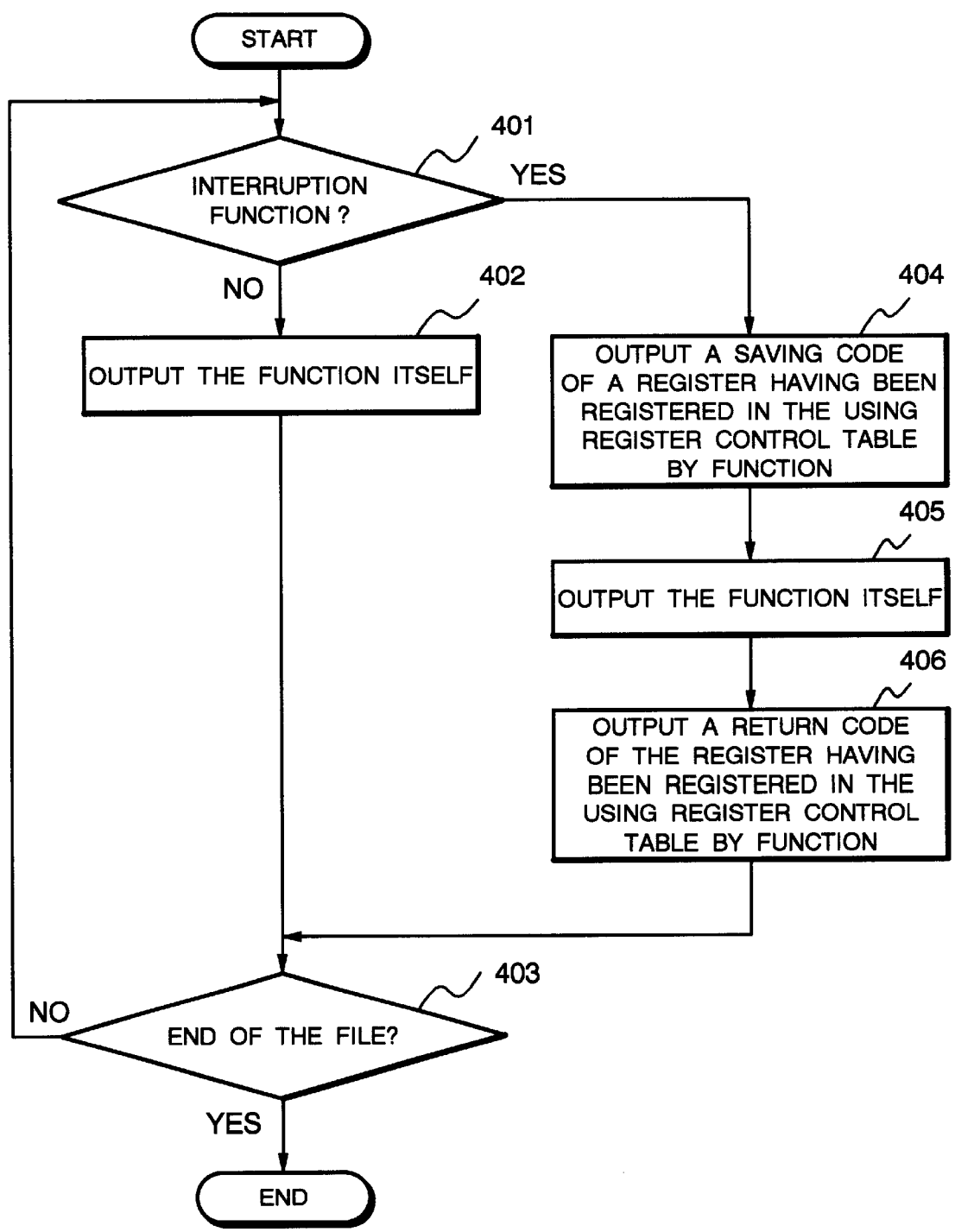
FIG. 4 is a flow chart showing the detailed operation of optimization according to the embodiment as well as operation of an output unit.

With reference to FIG. 4, the output unit 80 reads the intermediate code 112 and detects an interruption function of the source program 111. When the function is judged to be an interruption function, the output unit 80 supplies a saving code of a register which has been registered in the corresponding using register space 52 of the using register control table by function 50 (Steps 401 and 402). It also supplies an output code of the function itself (Step 403) and thereafter supplies a return code of the saved register (Step 404). On the other hand, when the function is not an interruption function, it supplies the output code of the function itself immediately (Step 405). The above processing will be repeated until the end of the file and the processing will be finished when the end of the file has been processed (Step 406).

The above-mentioned compiler of the embodiment may be realized by a CPU controlled by a program and an internal memory such as a RAM or the like, in a computer system such as a workstation, a personal computer, or the like. The computer program controlling the CPU is provided stored in a magnetic disk, an optical disk, a semiconductor memory, or the other general storing medium, and each function of the above-mentioned components is executed by loading the program into an internal memory of a computer system so as to control the CPU.

This time, the operation of the embodiment will be described more concretely, in conjunction with the processing for the source program shown in FIG. 6.

The operations of the input unit 10 receiving the source program 111, the syntax analysis unit 20 generating a syntactic tree, the optimization unit 30 performing optimization, the code generation unit 40 generating the intermediate code 112 (refer to Steps 201 to 204 in FIG. 2) are the same as those of the conventional compiler, thereby omitting their description.

The operation of the using register extracting unit by function 60 will be described with reference to the flow chart of FIG. 3A and FIG. 6. The using register extracting unit by function 60 receives the intermediate code 112 and detects the definition of each function. Recognizing the definition of the function f1 in the source program shown in FIG. 6, the unit 60 registers the function name f1 into the function name space 51 of the using register control table by function 50 (Steps 301 and 302). Then, it registers the register names "a", "b" which specifies the using register names of the function f1 into the corresponding using register space 52 of the using register control table by function 50 (Step 303). It also registers the function names f2, f3 of the called party into the corresponding call function space 53 of the using register control table by function 50 (Step 304).

It is judged whether the definition of the same function f1 is the end of the file or not. Since it is not the end of the file, the operation returns to Step 301, where the unit 60 detects the definition of the next function (Step 305). Here, the definition of the function f2 is to be recognized next.

The using register extracting unit by function 60 registers the function name f2 into the function name space 51 of the using register control table by function 50 (Steps 301 and 302). It registers the register name "c" specifying the using register of the function f2 into the corresponding using register space 52 of the using register control table by function 50 (Step 303). It also registers the function name f4 of the called party into the corresponding call function space 53 of the using register control table by function 50 (Step 304).

This time, it is judged whether the definition of the function f2 is the end of the file or not. Since it is not the end of the file, the operation returns to Step 301, where the unit 60 detects the definition of the next function (Step 305). Here, the definition of the function f3 is to be recognized next.

The unit 60 registers the function name f3 into the function name space 51 of the using register control table by function 50 (Steps 301 and 302). It registers the register name "d" specifying the using register of the function f3 into the corresponding using register space 52 of the using register control table by function 50 (Step 303). It also registers the function names f5 and f2 of the called party into the corresponding call function space 53 of the using register control table by function 50 (Step 304).

It is judged whether the definition of the function f3 is the end of the file or not. Since it is not the end of the file, the operation returns to Step 301, where the unit 60 detects the definition of the next function (Step 305). Here, the definition of the function f4 is to be recognized next.

The unit 60 registers the function name f4 into the function name space 51 of the using register control table by function 50 (Steps 301 and 302). It registers the register name "e" specifying the using register of the function f4 into the corresponding using register space 52 of the using register control table by function 50 (Step 303). It also registers the function name f3 of the called party into the corresponding call function space 53 of the using register control table by function 50 (Step 304).

It is judged whether the definition of the function f4 is the end of the file or not. Since it is not the end of the file, the operation returns to Step 301, where the unit 60 detects the definition of the next function (Step 305). Here, the definition of the function f5 is to be recognized next.

The unit 60 registers the function name f5 into the function name space 51 of the using register control table by function 50 (Steps 301 and 302). It registers the register name "f" specifying the using register of the function f5 into the corresponding using register space 52 of the using register control table by function 50 (Step 303). With reference to FIG. 6, since the function f5 calls no function, it registers nothing in the call function space 53 (Step 304).

Next, it is judged whether the definition of the function f5 is the end of the file or not. Since it is not the end of the file, the operation returns to Step 301, where the unit 60 detects the definition of the next function (Step 305). Here, the definition of the function f6 is to be recognized next.

The unit 60 registers the function name f6 into the function name space 51 of the using register control table by function 50 (Steps 301 and 302). It registers the register names "g", "h" specifying the using registers of the function f6 into the corresponding using register space 52 of the using register control table by function 50 (Step 303). It also registers the function name f5 of the called party into the corresponding call function space 53 of the using register control table by function 50 (Step 304).

It is judged whether the definition of the function f6 is the end of the file or not. Since it is the end of the file, the operation of the using register extracting unit by function 60 is finished (Step 305). The using register control table by function 50 generated as mentioned above is shown in FIG. 5(A).

The operation of the using register totaling unit by function 70 will be described with reference to the flow charts of FIGS. 3B and 3C and FIG. 5(A). The using register totaling unit by function 70 judges whether the information has been registered or not, with reference to the using register control table by function 50 shown in FIG. 5(A). Since the information has been registered as shown in FIG. 5(A), the unit 70 reads the first string, that is, the string of the function f1 (Steps 311 and 312). It recognizes the function name f2 registered in the call function space 53 and deletes the function name f2 from this call function space 53 (Steps 313 and 314). Then, it calls the using register totaling procedure by function (Step 315).

With reference to FIG. 3C, the using register totaling unit by function 70 reads the string of the function name f2 called by the function f1 in the using register control table by function 50, in the using register totaling procedure by function (Step 321). It recognizes the function name f4 registered in the call function space 53 and deletes the function name f4 from this call function space 53 (Steps 322 and 323). It calls the using register totaling procedure by function recursively (Step 324).

The using register totaling unit by function 70 reads the string of the function name f4 called by the function f2 in the using register control table by function 50 (Step 321). It recognizes the function name f3 registered in the call function space 53 and deletes the function name f3 from this call function space 53 (Steps 322 and 323). It calls the using register totaling procedure by function recursively (Step 324).

Similarly, the using register totaling unit by function 70 reads the string of the function name f3 called by the function f4 from the using register control table by function 50 (Step 321). It recognizes the function name f5 registered in the call function space 53 and deletes the function name f5 from this call function space 53 (Steps 322 and 323). It calls the using register totaling procedure by function recursively (Step 324).

Similarly, the using register totaling unit by function 70 reads the string of the function name f5 called by the function f3 from the using register control table by function 50 (Step 321). When it recognizes no function name registered in the call function space 53, it puts the using register "f" of the function f5 together with the using register of the calling function f3 in the using register space 52 of the function f3, that is the calling party for the function f5 (Steps 322 and 325). Then, the using register totaling procedure by function with respect to the function f5 is finished.

This time, the operation returns to the using register totaling procedure by function with respect to the function f3, where the unit 70 recognizes the other function name f2 registered in the call function space 53 and deletes the function name f2 from this call function space 53 (Steps 322 and 323). It calls the using register totaling procedure by function recursively (Step 324).

The using register totaling unit by function 70 reads the string of the function name f2 called by the function f3 in the using register control table by function 50 (Step 321). It recognizes no other function name registered in the call function space 53 and puts the using register "c" of the function f2 together with the using registers of the function f3 in the using register space 52 of the function f3, that is the calling party for the function f2 (Steps 322 and 325). Then, the using register totaling procedure by function with respect to the function f2 is finished.

This time, the operation returns to the using register totaling procedure by function with respect to the function f3. When it recognizes no more function name registered in the call function space 53, it puts the using register "d" of the function f3 and the using registers "f", "c" which have been combined together in the above-mentioned processing together with the using register of the function f4, in the using register space 52 of the function f4 that is the calling party for the function f3 (Steps 322 and 325). Then, the using register totaling procedure by function with respect to the function f3 is finished.

The operation returns to the using register totaling procedure by function with respect to the function f4. When it recognizes no more function name registered in the call function space 53, it puts the using register "e" of the function f4 and the using registers "d", "f", "c" which have been combined together in the above-mentioned processing, in the using register space 52 of the function f2 that is the calling party for the function f4 (Steps 322 and 325). Then, the using register totaling procedure by function with respect to the function f4 is finished.

The operation returns to the using register totaling procedure by function with respect to the function f2. When it recognizes no more function name registered in the call function space 53, it puts the using register "c" of the function f2 and the using registers "e", "d", "f" which have been combined together in the above-mentioned processing together, in the using register space 52 of the function f1 that is the calling party for the function f2 (Steps 322 and 325). Then, the using register totaling procedure by function with respect to the function f2 is finished.

When all the using register totaling procedures have been finished with respect to the called functions, the operation returns to the operation shown in FIG. 3B, where the unit 70 recognizes the next function name f3 registered in the call function space 53 and deletes the function name f3 from the call function space 53 (Steps 313 and 314). Then, it calls the using register totaling procedure by function (Step 315).

The using register totaling unit by function 70 reads the string of the function f3 called by the function f1 in the using register control table by function 50 (Step 321). When it recognizes no other function name registered in the call function space 53, it puts the using registers "d", "f", "c" of the function f3 together with the using functions of the function f1, in the using register space 52 of the function f1 that is the calling party for the function f3 (Steps 322 and 325). Then, the using register totaling procedure by function with respect to the function f3 is finished.

When the using register totaling procedure by function has been finished, the operation returns to the operation shown in FIG. 3B. When the unit 70 recognizes no other function name registered in the call function space 53, the operation returns to Step 311 (Step 313). Then, it reads the next string, that is, the string of the function name f2 (Steps 311 and 312). When it recognizes no other function name registered in the call function space 53, the operation returns to Step 311 (Step 313). Similarly, it reads the next string, that is, the string of the function name f3 (Steps 311 and 312). When it recognizes no other function name registered in the call function space 53, the operation returns to Step 311 (Step 313). Similarly, it reads the next string, that is, the string of the function name f4 (Steps 311 and 312). When it recognizes no other function name registered in the call function space 53, the operation returns to Step 311 (Step 313). Similarly, it reads the next string, that is, the string of the function name f5 (Steps 311 and 312). When it recognizes no other function name registered in the call function space 53, the operation returns to Step 311 (Step 313).

In the same way, it reads the next string, that is, the string of the function name f6 (Steps 311 and 312). It recognizes the function name f5 registered in the call function space 53 and deletes the function name f5 from this call function space 53 (Steps 313 and 314). Since there is a function at the called party, the using register totaling procedure by function is called (Step 315).

With reference to FIG. 3C, the using register totaling unit by function 70 reads the string of the function name f5 called by the function f6 in the using register control table by function 50 (Step 321). When it recognizes no more function name registered in the call function space 53, it puts the using register "f" of the function f5 together with the using registers of the function f6, in the using register space 52 of the function f6, that is the calling party for the function f5 (Steps 322 and 325). Then, the using register totaling procedure by function is finished with respect to the function f5.

When the using register totaling procedure by function has been finished, the operation returns to the operation shown in FIG. 3B. When the unit 70 recognizes no more function name registered in the call function space 53, the operation returns to Step 311 (Step 313). When it judges that there exists no more string next to the function f6 in the using register control table by function 50, all the processing by the using register totaling unit by function 70 is finished (Step 311). The using register control table by function 50 generated as mentioned above is shown in FIG. 5(B).

The operation of the output unit 80 will be described with reference to the flow chart of FIG. 4, and FIG. 5(B) and FIG. 6. The output unit 80 receives the intermediate code 112 and detects an interruption function. When it is judged that the function f1 of the source program shown in FIG. 6 is an interruption function, the output unit 80 supplies the saving code of the registers "a", "b", "c", "e", "d", and "f" having been registered in the using register space 52, with reference to the string of the function name f1 of the using register control table by function 50 (Steps 401 and 402).

Then, the output unit 80 supplies the code of the function f1 itself (Step 403). Thereafter, it supplies the return code of the registers "a", "b", "c", "e", "d", and "f" having been registered in the using register space 52, again with reference to the string of the function name f1 of the using register control table by function 50 (Step 404).

The unit 80 judges whether the function f1 is the end of the file or not. Since it is not the end of the file, it detects a next interruption function (Steps 406 and 401). With respect to the functions other than the interruption function, it supplies only the code of the function itself (Steps 401, 405, and 406).

When it judges that the function f6 of the source program shown in FIG. 6 is an interruption function, it supplies the saving code of the registers "g", "h", "f" having been registered in the using register space 52, with reference to the string of the function name f6 of the using register control table by function 50 (Steps 401 and 402).

The unit 80 supplies the code of the function f6 itself (Step 403). Thereafter, it supplies the return code of the registers "g", "h", "f" having been registered in the using register space 52, again referring to the string of the function name f6 of the using register control table by function 50 (Step 404).

It judges whether the function f6 is the end of the file or not. Since it is the end of the file, the processing by the output unit 80 is finished.

As set forth herein above, according to the compiler of the present invention and its optimization method, the using register totaling unit by function totals the registers used by the function called by an interruption function, which is newly registered in the above using register control table by function as the using registers of the interruption function of the calling party, thereby making it possible to save and return the using registers only. Therefore, this enables the registers saved and returned by the interruption function at the minimum quantity. It is effective in that the code and the size of an interruption function can be reduced and that the execution time can be shortened, so as to improve the processing efficiency in executing an assembly program file.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A compiler reading a source program so as to perform a lexical analysis and a syntax analysis, generate an intermediate code, and add saving/return codes of a using register of a function, thereby generating an assembly program file, comprising:

a using register control table by function for registering the information on a using register of a function and the information on a call function called by the function, in every function within the source program;

a using register extracting means by function for extracting a using register and a call function name, in every function, after analysis of the intermediate code, and registering the same into said using register control table by function;

a using register totaling means by function for totaling the registers used by a function called by an interruption function, with reference to said using register control table by function with the information registered therein by said using register extracting means by function, and newly registering the totaled registers in said using register control table by function as the using registers of the interruption function; and an output means for adding saving/return codes of a using register of the interruption function to the intermediate code, with reference to said using register control table by function having the using registers totaled by said using register totaling means by function, so to generate and supply an assembly program file.

2. A compiler as set forth in claim 1, wherein said using register control table by function includes a function name space for registering a function name, a using register space for registering a using register name of the function, and a call function space for registering a call function name called by the function.

3. A compiler as set forth in claim 1, wherein
said using register totaling means by function
   reads the information having been registered in said using register control table by function sequentially in each function, so as to judge whether there exists a call function called by the function, and
   when there exists a call function called by the function, said unit deletes the call function from said using register control table by function, reads out the register information of the call function from said using register control table by function, and combines the using register of the call function with the using register of the calling function.

4. A compiler as set forth in claim 1, wherein
said using register totaling means by function
   reads the information having been registered in said using register control table by function sequentially in each function, so as to judge whether there exists a call function called by the function;
   when there exists a call function called by the function, said unit deletes the call function from said using register control table by function, reads out the register information of the call function from said using register control table by function, and judges whether there exists a call function further called by this function;
   when there exists a call function further called by this call function, said unit repeats the operation of deleting the call function and reading the information on this call function recursively; and
   when there exists no more call function called by the noticed function, said unit combines the using register of the noticed function with the using register of the calling function that is the calling party for the noticed function.

5. A compiler as set forth in claim 1, wherein
said output means,
   with respect to an interruption function within the intermediate code, supplies the interruption function itself, supplies a saving code of a using register of the interruption function before the interruption function itself, and supplies a return code of the using register of the interruption function after the interruption function itself, while,
   with respect to the function other than the interruption function, said means supplies the function itself.

6. An optimization method in a compiler reading a source program so as to perform a lexical analysis and a syntax analysis, generate an intermediate code, and add saving/return codes of a using register in a function, thereby generating an assembly program file, comprising the following steps of:

extracting a using register and a call function name, in every function, after analysis of the intermediate code, and registering the same into said using register control table by function;

totaling the registers used by a function called by an interruption function, with reference to said using register control table by function with the information registered therein by said using register registering step, and newly registering the totaled registers in said using register control table by function as the using registers of the interruption function; and adding saving/return codes of a using register of the interruption function to the intermediate code, with reference to said using register control table by function having the using registers totaled by said using register totaling step, so to generate and supply an assembly program file.

7. An optimization method of a compiler as set forth in claim 6, wherein said every function using register totaling step further includes:

a step of reading the information having been registered in said using register control table by function sequentially in each function, so as to judge whether there exists a call function called by the function; and a step of, when there exists a call function called by the function, deleting the call function from said using register control table by function, reading out the register information of the call function from said using register control table by function, and combining the using register of the call function with the using register of the calling function.

8. An optimization method of a compiler as set forth in claim 6, wherein said every function using register totaling step further includes:

a step of reading the information having been registered in said using register control table by function sequentially in each function, so as to judge whether there exists a call function called by the function;

a step of, when there exists a call function called by the function, deleting the call function from said using register control table by function, reading out the register information of the call function from said using register control table by function, and judging whether there exists a call function further called by this function;

a step of, when there exists a call function further called by the above-mentioned call function, repeating the operation of deleting the call function and reading the information on this call function recursively; and a step of, when there exists no more call function called from the noticed function, combining the using register of the noticed function with the using register of the calling function that is the calling party for the noticed function.

9. An optimization method of a compiler as set forth in claim 6, wherein said output step includes:

a step of judging whether a function within the intermediate code is an interruption function or not; and with respect to an interruption function, said step includes:

a step of supplying a saving code of a using register of the interruption function before the interruption function itself;

a step of supplying the interruption function itself; and a step of supplying a return code of a using register of the interruption function after the interruption function itself.

10. A computer readable memory storing a control program for generating an assembly program file by reading a source program, performing a lexical analysis and a syntax analysis, generating an intermediate code, and adding saving/return codes of a using register in a function, in a computer system, the control program comprising the following steps of:

extracting a using register and a call function name, in every function, after analysis of the intermediate code, and registering the same into said using register control table by function;

totaling the registers used by a function called by an interruption function, with reference to said using register control table by function with the information registered therein by said using register registering step, and newly registering the totaled registers in said using register control table by function as the using registers of the interruption function; and adding saving/return codes of a using register of the interruption function, to the intermediate code, with reference to said using register control table by function having the using registers totaled by said using register totaling step, so to generate and supply an assembly program file.

11. A computer readable memory as set forth in claim 10, wherein said every function using register totaling step of said control program further includes:

a step of reading the information having been registered in said using register control table by function sequentially in each function, so as to judge whether there exists a call function called by the function; and a step of, when there exists a call function called by the function, deleting the call function from said using register control table by function, reading out the register information of the call function from said using register control table by function, and combining the using register of the call function with the using register of the calling function.

12. A computer readable memory as set forth in claim 10, wherein said every function using register totaling step of said control program further includes:

a step of reading the information having been registered in said using register control table by function sequentially in each function, so as to judge whether there exists a call function called by the function;

a step of, when there exists a call function called by the function, deleting the call function from said using register control table by function, reading out the register information of the call function from said using register control table by function, and judging whether there exists a call function further called by this function;

a step of, when there exists a call function further called by the above-mentioned call function, repeating the operation of deleting the call function and reading the information on this call function recursively; and a step of, when there exists no more call function called from the noticed function, combining the using register of the noticed function with the using register of the calling function that is the calling party for the noticed function.

13. A computer readable memory as set forth in claim 10, wherein said output step of said control program includes:

a step of judging whether a function within the intermediate code is an interruption function or not; and with respect to an interruption function, said step includes:

a step of supplying a saving code of a using register of the interruption function before the interruption function itself;

a step of supplying the interruption function itself; and a step of supplying a return code of a using register of the interruption function after the interruption function itself.

\* \* \* \* \*